United States Patent [19]
Goodbary et al.

[11] Patent Number: 4,684,152
[45] Date of Patent: Aug. 4, 1987

[54] OFF-HIGHWAY VEHICLE BODY SUPPORT STRUCTURE

[76] Inventors: Edgar R. Goodbary; Francis A. Bartley, both of P.O. Box 100, Cardin, Okla. 74335

[21] Appl. No.: 236,299

[22] Filed: Aug. 20, 1981

Related U.S. Application Data

[60] Continuation of Ser. No. 068,167, Aug. 20, 1979, abandoned, which is a continuation of Ser. No. 875,192, Feb. 6, 1978, abandoned, which is a division of Ser. No. 744,429, Nov. 23, 1976, abandoned.

[51] Int. Cl.$^4$ ............................................. B62D 21/12
[52] U.S. Cl. .................................................. 280/785
[58] Field of Search ............... 280/104, 112 R, 112 A, 280/111, 663, 667, 724, 725, 726, 785; 298/11, 12, 17 R

[56] References Cited

U.S. PATENT DOCUMENTS

| | | | |
|---|---|---|---|
| 2,536,337 | 1/1951 | Whitlow | 280/111 |
| 3,567,243 | 3/1971 | Ruhlin | 280/66.3 |
| 3,786,889 | 1/1974 | Kelley | 280/663 |
| 4,063,361 | 12/1977 | Hyler | 280/112 A |

Primary Examiner—John J. Love
Assistant Examiner—Karin L. Ferriter
Attorney, Agent, or Firm—Head Johnson Stevenson

[57] ABSTRACT

A pair of A-frames and a pair of torque tubes are used in a body support structure of an off highway vehicle to carry all of the load of the vehicle. The vehicle load in the rear is carried directly on the torque tubes and the front load is cantilevered from the torque tubes.

2 Claims, 9 Drawing Figures

OFF-HIGHWAY VEHICLE BODY SUPPORT STRUCTURE

This is a continuation of application Ser. No. 068,167, filed Aug. 20, 1979, now abandoned, which was a continuation of application Ser. No. 875,192, filed Feb. 6, 1978, now abandoned, which was a division of application Ser. No. 744,429, filed Nov. 23, 1976, now abandoned.

BACKGROUND OF THE INVENTION

1. Field of the Invention

This invention relates to improvements in off-highway vehicles and more particularly, but not by way of limitation, to a bottom dump type off-highway vehicle of the general two axle type having a single-wheel in all positions, and having a front engine in combination with a rear wheel drive.

2. Description of the Prior Art

Off-highway vehicles are in widespread use today for hauling extremely large and heavy loads in order to reduce time and expense in many industries, such as in the opening mining industry, large construction industry, and the like. The usual or conventional off-highway vehicle of this type is a tractor-trailer hauling unit such as shown in the Lackey et al U.S. Pat. No. 3,134,628, issued May 26, 1964, and entitled "Tilting Dumping Trailer". These units are usually powered only on the middle axle, and if proper tire loading is maintained for a balanced design, there is not adequate loading on the drive axle for negotiating roadway grades. Tractor-Trailers are thus normally limited to grades of not more than three percent or four percent maximum. In addition, tractor-trailer type hauling vehicles usually have only three points of support and as a result may turn over somewhat readily. The relatively high center of gravity of these units also increases the instability thereof. Of course, as usage of these vehicles increases, there is an ever increasing demand for even larger and heavier units, which adds to the difficulties encountered in both the manufacture and use of the vehicles.

SUMMARY OF THE INVENTION

The present invention contemplates an off-highway vehicle of the dump type which has been particularly designed and constructed for overcoming the foregoing disadvantages. The novel vehicle is a two-axle type vehicle as opposed to the tractor-trailer type unit, having a bottom dump, and a single wheel in all positions. The overall configuration of the vehicle may be generally considered as a rectangular box-type construction having a wheel at each corner of the box. The novel unit is provided with a front engine and rear drive wheels which provide the power or tractive force at the rear of the vehicle with a resultant high gradeability for the vehicle. The two-axle design of the vehicle provides a greater stability in that there are four points of contact rather than the three point contact in the tractor-trailer vehicle design. In addition, the design of the bottom dump body results in a relatively low center of gravity for the vehicle which contributes to the greater stability for the unit. In fact, it has been found that a loaded vehicle embodying the present invention moving through a turn or curve at a relatively high speed will have good ground clearance, even if the two outside tires are flat, and the vehicle will tend to slide sideways rather than turn over.

The provision of a single wheel at each position as opposed to dual tires at each or any of the positions greatly reduces overall costs, particularly in view of the fact that one of the greatest expenses in these large vehicles is the tire replacement cost and other items pertaining to the tires. The steering forces are also reduced, and the overall weight of the vehicle is reduced without reducing the haulage volume. The single wheel feature reduces heating of the tires during operation of the vehicle and reduces tire wear in turns, and the like, and permits a wider suspension mounting for further improvement of the vehicle stability. In addition, substantially equal static tire loading has been achieved front to back which permits a common tire size for each wheel, thus permitting the use of interchangeable wheel rims at all positions.

As set forth in the Goodbary et al co-pending application entitled "Dual Steering System for Vehicles", Ser. No. 744,431, filed Nov. 23, 1976, now U.S. Pat. No. 4,131,177, issued Dec. 26, 1978, a dual steering system is provided for the vehicle whereby a primary and secondary steering system functions in such a manner that in the event of failure of the primary steering system for any reason, the secondary steering system assumes the steering operation and efficiently controls the steering of the vehicle. In addition, a dual braking system is provided for the vehicle for a generally similar purpose. A disc brake type braking system is provided including a primary braking system and a secondary braking system. Both braking systems are operable by a common brake pedal provided in the cab of the vehicle. The braking systems are interrelated in such a manner that upon the failure of the primary braking system for any reason, the secondary braking system automatically assumes the braking operation for an efficient and substantially "fail safe" braking system.

BRIEF DESCRIPTION OF THE DRAWINGS

FIG. 9 is a perspective view of the A-frame means and torque tube means utilized in the invention.

DESCRIPTION OF THE PREFERRED EMBODIMENT

Figure 1:
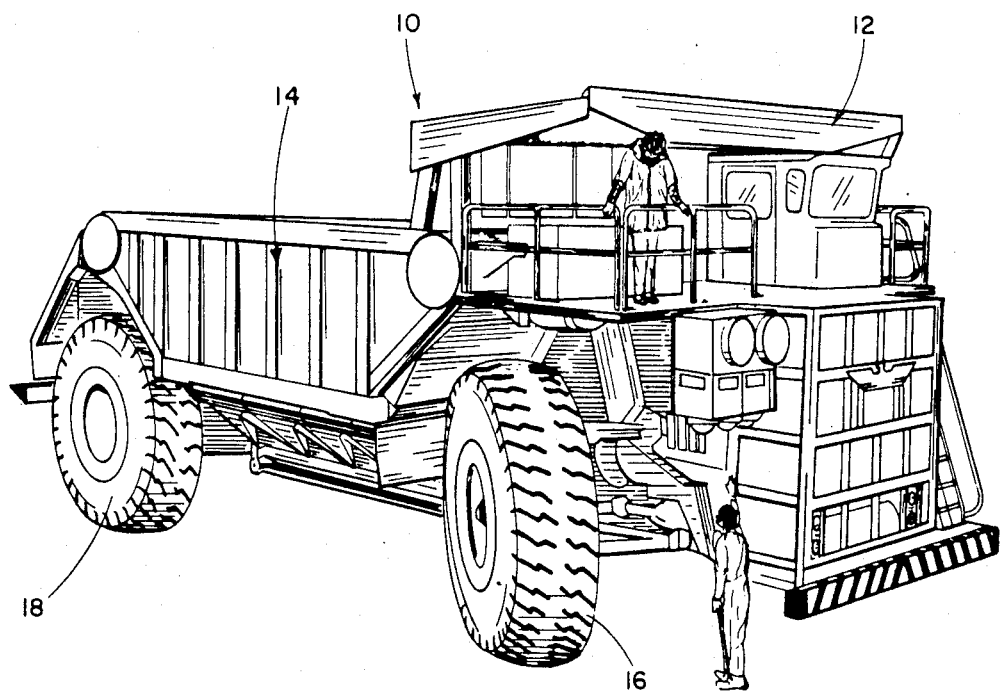
FIG. 1 is a right front perspective view of an offhighway vehicle embodying the invention.

Referring to the drawings in detail, reference character 10 generally indicates an off-highway vehicle comprising a cab section 12, a dump body section 14, a pair of front wheels 16 independently mounted on the vehicle 10, and a pair of rear wheels 18 suitably journalled on the opposite ends of a common axle 19. The overall or general configuration of the vehicle 10 can be considered as corresponding to a rectangular box having a wheel mounted at each corner of the box, thus providing four contact points for the vehicle which greatly increase the stability thereof. Each wheel position is provided with a single wheel as particularly shown in FIGS. 1 and 2, rather than the dual wheels normally provided in off-highway vehicles. This single wheel arrangement greatly reduces heat generation during operation of the vehicle, and results in less wear and abrasion on the tires for lengthening the useful life of the tire and reducing the replacement or repair expenses thereof.

Figure 4:
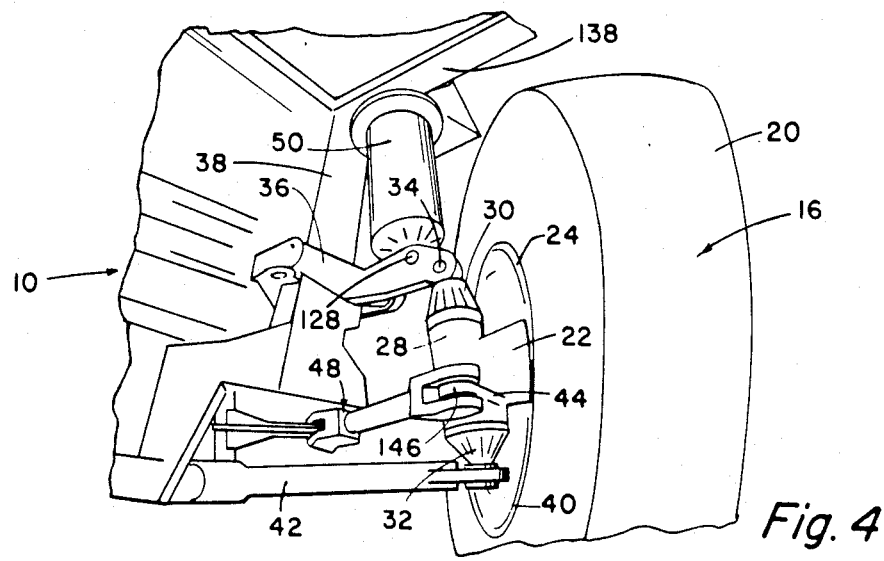
FIG. 4 is a perspective view of the wheel mounting arrangement of an off-highway vehicle embodying the invention.

Referring now to FIG. 4, the front wheels 16 are independently mounted on the opposite sides of the forward portion of the vehicle 10 and are connected with the vehicle 10 in a manner for steering of the vehicle as set forth in detail in the Goodbary et al co-pending application entitled "Dual Steering for Vehicles" now U.S. Pat. No. 4,131,177. The wheel 16 comprises the usual tire 20 mounted on a wheel rim 24 in the manner as disclosed in the Goodbary co-pending application entitled "Wheel Rim and Brake Disc for Off-Highway Vehicles", Ser. No. 744,437, filed Nov. 23, 1976, now U.S. Pat. No. 4,082,363, issued Apr. 4, 1978. A pair of oppositely disposed brake calipers 22 (only one of which is shown in FIG. 4) support suitable disc-type brakes (not shown) disposed within the wheel rim 24 as shown in the aforementioned Goodbary application and the outboard side of the wheel 16 is provided with a suitable dust cover 26 which cooperates with an inboard sealing means (not shown) similar to that disclosed in the aforementioned Goodbary pending application for sealing the interior of the wheel rim against contamination by foreign particles.

The calipers 22 are rigidly secured to the outer periphery of a substantially upright, but canted, hollow spindle member 28 in any suitable manner, such as by welding or the like. The upper end of the spindle 28 is closed by a suitable connector member 30, and the lower end of the spindle 28 is closed by a suitable connector member 32. The connector member 30 is pivotally secured at 34 to a structural member 36, which in turn is pivotally secured to a front A-frame structure 38 of the vehicle 10. The connector 32 is pivotally secured at 40 to a structural element 42, which in turn is suitably secured to the A-frame 38. An outwardly extending flange 44 is provided on the outer periphery of the spindle 28 and is pivotally secured at 146 to a steering linkage assembly generally indicated at 48. Of course, the steering linkage assembly 48 is secured to the vehicle in any well known or suitable manner and is operable for steering the wheels 16 in the manner as set forth in the aforementioned Goodbary et al pending application. In addition, suspension assembly 50 is secured between the structural element 36 and the A-frame 38, or other portion of the vehicle 10 for facilitating the suspension of the wheel 16 from the vehicle 10 and for absorbing substantially all of the shock from the wheel 16 as the vehicle moves over rough terrain, or the like.

Figure 5:
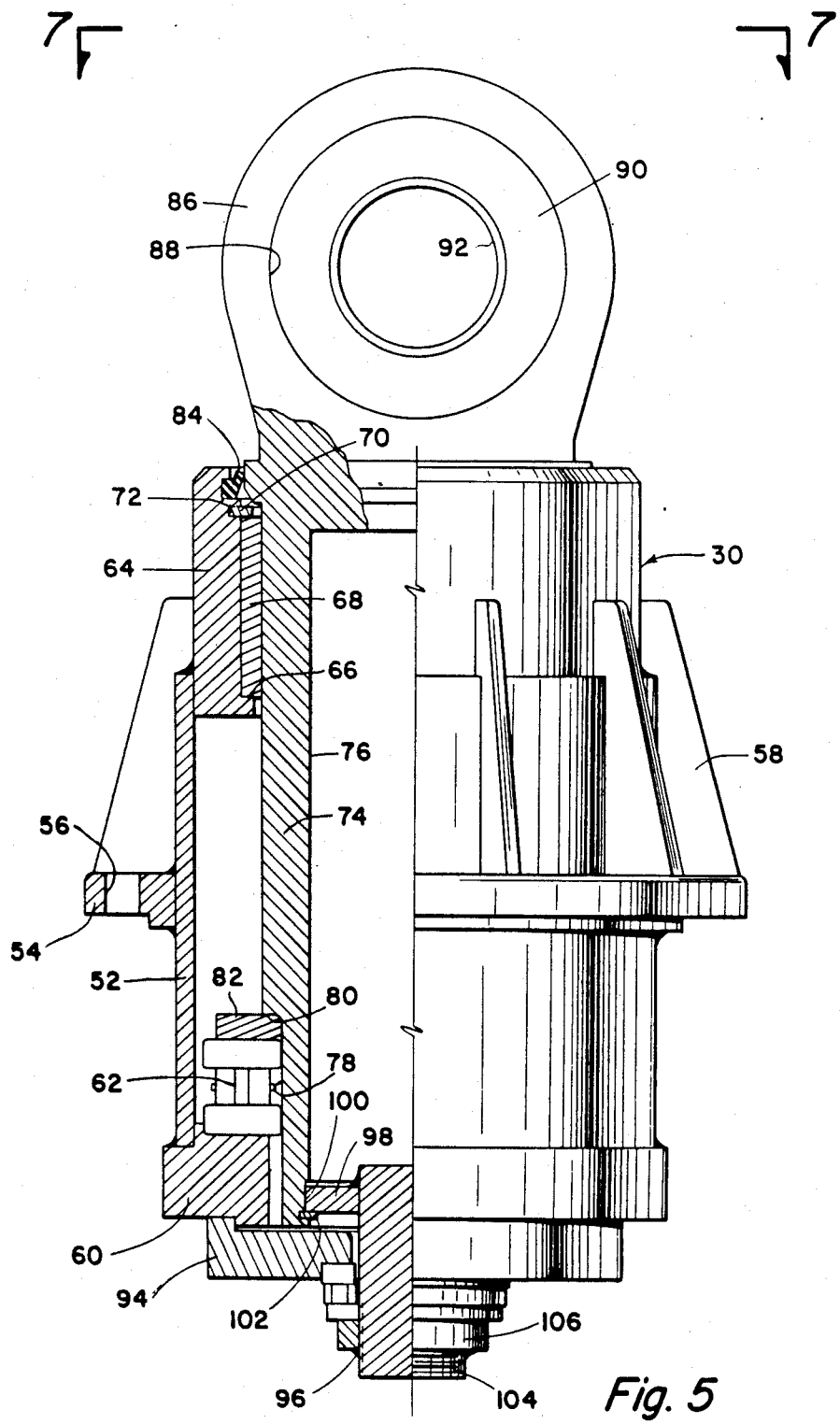
FIG. 5 is an elevational view, partly in section, of a spindle member utilized in securing a wheel to an off-highway vehicle embodying the invention.

Referring now to FIG. 5, the upper connector member 30 is shown in enlarged detail, and the connector member 30 may be referred to as a king pin connector. The connector 30 comprises an outer sleeve or housing 52 having an outwardly extending circumferential flange 54 provided on the outer periphery thereof for suitable connection with the spindle 28. As for example, the flange 54 may be provided with a plurality of circumferentially spaced bolt holes 56 for alignment with complimentary bolt holes (not shown) provided in the proximity of the upper end of the spindle 28 whereby bolts (not shown) may be utilized for bolting the connector 30 to the spindle 28. In addition, a plurality of circumferentially spaced gussets or web members 58 may be welded or otherwise secured between the outer periphery of the sleeve 52 and the flange 54 for strengthening of the sleeve 52, as is well known.

An inwardly directed annular flange 60 is rigidly secured to the lower end of the housing or sleeve 52 as viewed in FIG. 5, for supporting a suitable bearing 62 thereon. A reduced diameter sleeve 64 is rigidly secured to the upper end of the sleeve 52, and is provided with an annular shoulder 66 on the inner periphery thereof for supporting a suitable bushing or bearing sleeve 68 thereon. A suitable lock ring 70 is disposed in an annular recess or groove 72 provided in the inner periphery of the sleeve 64 in spaced relation with respect to the shoulder 66. The lock ring 70 is engageable with the bushing 68 for securely retaining the bushing in position within the sleeve 64.

A rotatable housing 74 having a central passageway 76 extending longitudinally therethrough is concentrically disposed within the sleeve 52 and has the outer periphery of the upper end thereof in rotatable engagement with the bushing 68 as clearly shown in FIG. 5. The lower end of the housing 74 is reduced as shown at 78 for providing an annular shoulder 80 around the outer periphery thereof. An annular ring member 82 is disposed against the shoulder 80 and is supported thereagainst by the bearing 62 whereby the bearing 62 cooperates with the bushing 68 for permitting free rotation of the inner housing 74 with respect to the outer sleeve or housing 52. In addition, suitable dynamic sealing means 84 is interposed between the sleeve 64 and the rotatable housing 74 in the proximity of the upper end of the sleeve 64 for precluding leakage of fluid therebetween and protecting the interior of the sleeve 52 from contamination.

The upper outer end of the inner housing 74 extends longitudinally outwardly from the sleeve 64 and is provided with a substantially flat axially extending flange member 86 having a central aperture 88 provided therein for receiving a suitable bearing 90. The bearing 90 is provided with a central bore 92 for receiving the pivot pin 34 therethrough in order that the connector member 30 may be pivotally secured to the structural 36 as hereinbefore set forth. It will be readily apparent that the pivotal connection 34 and rotatable housing 74 cooperate to provide a substantially universal connection for the wheel 16 with the vehicle 10. The wheel 16 may be rotated freely about the longitudinal axis determined by the housing 74, and the axis of the pivot rod 34.

The lower end of the sleeve 52 and the flange 60 secured thereto are disposed within the spindle 28 in the assembled position between the spindle and the connector 30. If desired, the lower end of the flange 60 may be closed by an annular end plate 94 having a central stud 96 carried thereby. The inner end of the stud 96 extends into the lower end of the housing 74 and is provided with a circumferential flange 98 secured to the outer periphery thereof which engages an enlarged diameter portion 100 of the bore 76 as particularly shown in FIG. 5. The flange 98 is secured in position by a suitable lock ring 102. The outer end of the stud 96 is preferably externally threaded, as shown at 104, for receiving a lock nut 106 thereon which engages the end plate 94 for securing the housing 52 to the inner housing 74.

Figure 6:
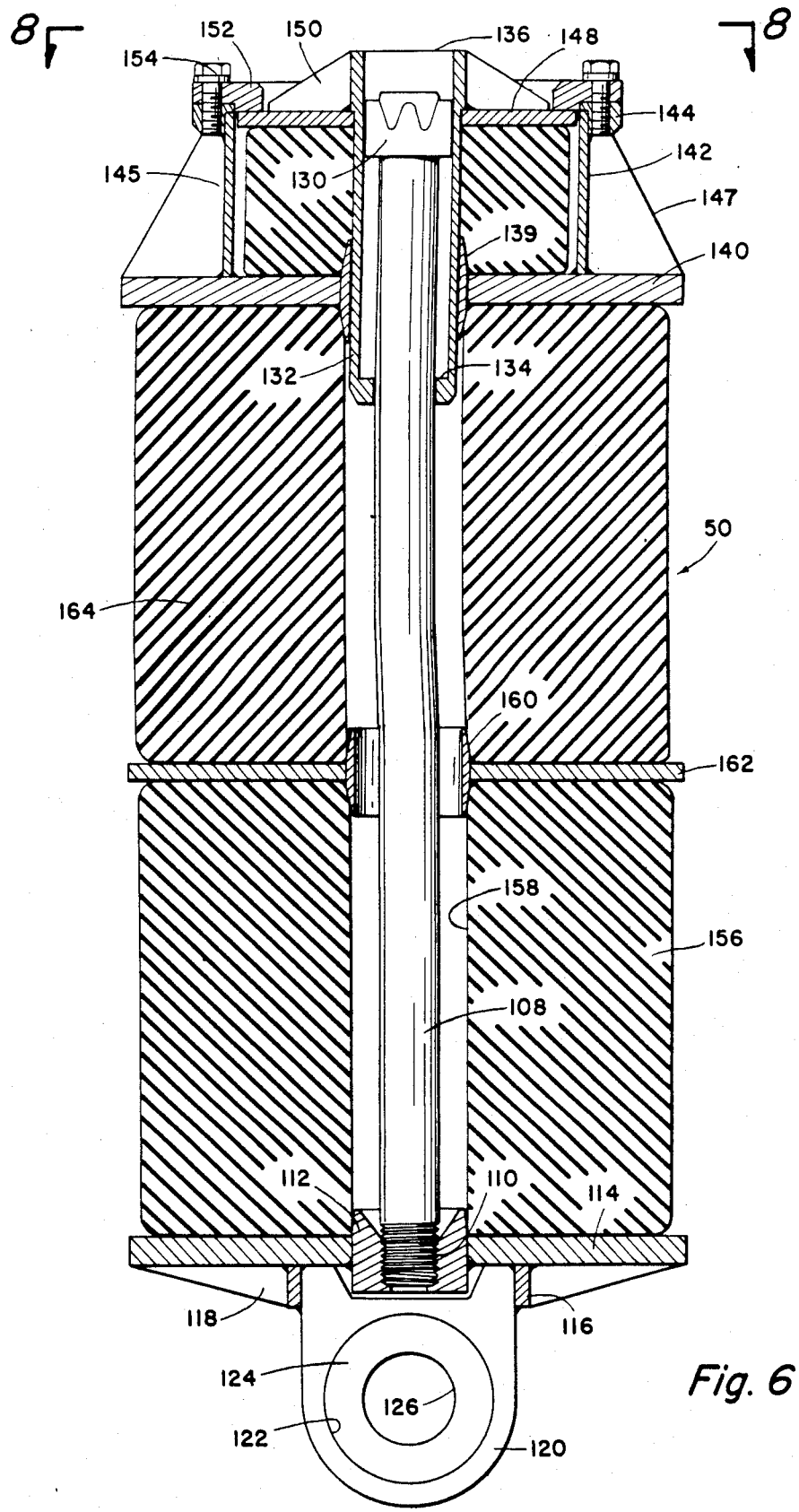
FIG. 6 is a sectional elevational view of a suspension assembly utilized in an off-highway vehicle embodying the invention.
Figure 7:
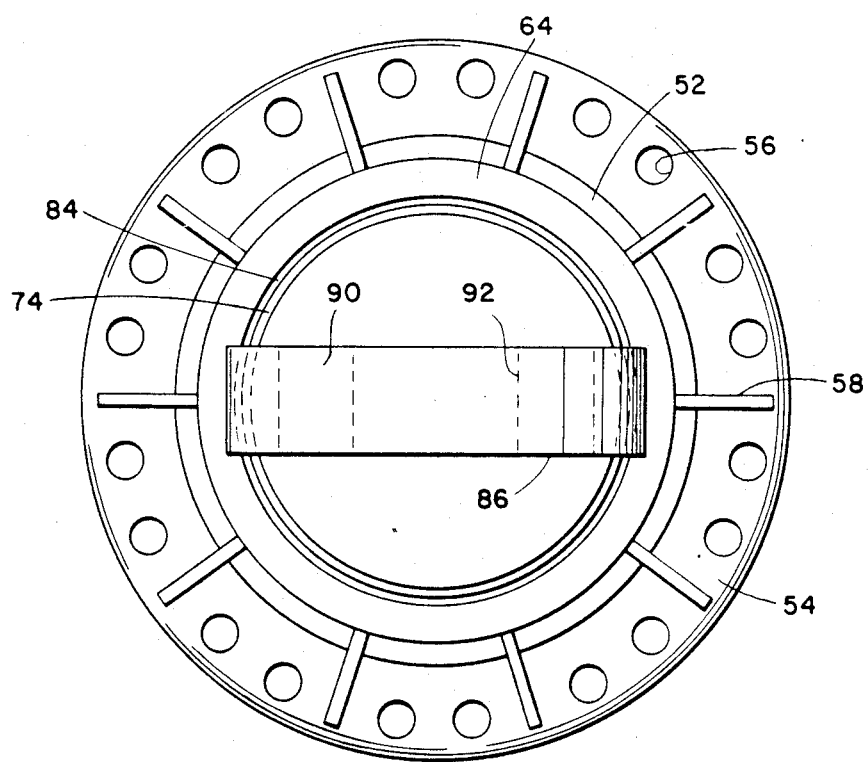
FIG. 7 is a view taken on line 7—7 of FIG. 5.
Figure 8:
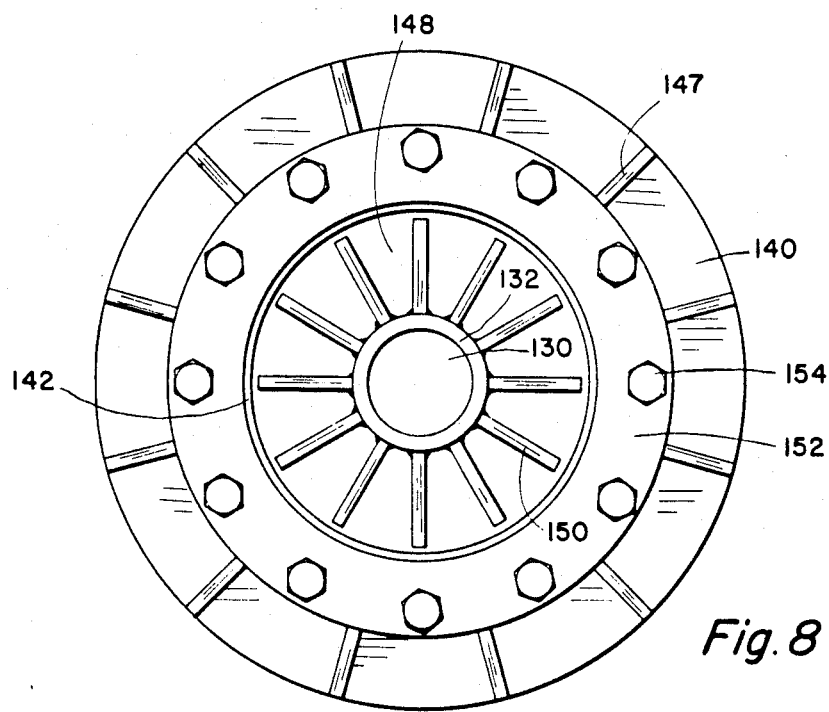
FIG. 8 is a view taken on line 8—8 of FIG. 6.

Referring now to FIG. 6, the suspension assembly 50 as shown herein comprises an elongated rod 108 having one end thereof provided with external threads 110 for threaded engagement with a hub member 112. A circumferential plate 114 is welded or otherwise rigidly secured around the outer periphery of the hub 112 and provides a bottom support member for the suspension assembly 50. A centrally disposed outwardly extending sleeve 116 may be secured to the exposed or outer face of the flange 114, if desired, and a plurality of circumferentially spaced gussets or webs 118 may be welded between the outer periphery of the sleeve 16 and the exposed face of the flange 114 for strengthening of the flange 114, as is well known. A substantially flat plate 120 may be secured within the sleeve 116 generally similar to the plate 86, and is provided with a central aperture 122 for receiving a bearing member 124 therein. The bearing member 124 is provided with a central bore 126 for receiving a pivot rod 128 (FIG. 4) therethrough in order that the suspension assembly 50 may be pivotally secured to the structural element 36, as is well known.

The upper end of the rod 108, as viewed in FIG. 6, supports a piston head member 130 which is slidably disposed in a hollow stem 132 which is concentrically disposed around the rod 108. The lower end of the stem 132 is provided with an inwardly directed annular shoulder 134 which limits the downward movement of the piston head 130 as will be hereinafter set forth. The upper end of the stem 132 is open as shown at 136, but is preferably in abuttment with the under surface of a deck 138 as particularly shown in FIG. 4. A hub member 139 is loosely disposed around the outer periphery of the stem 132 and a flange 140 is welded to the outer periphery of the hub 138 and extends radially outwardly therefrom to provide a top plate for the suspension assembly 50. A sleeve 142 is disposed concentrically around the stem 132 and is rigidly secured to the outer surface of the flange 140 and is provided with an outwardly extending circumferential flange 144 at the upper end thereof as viewed in FIG. 6. A plurality of strengthening gussets 147 are welded between the outer periphery of the sleeve 142 and the flange 140. An annular resilient pad 145 is disposed around the stem 132 and in the sleeve 142. A radially outwardly extending flange 148 is welded to the outer periphery of the stem 132 in spaced relation to the flange 140 for resting on the pad 145 and a plurality of strengthening gussets 150 are welded between the outer periphery of the stem 132 and the flange 148. A flanged annular ring 152 is removably secured to the flange 144 in any suitable manner, such as by a plurality of spaced bolts 154, and the flange 150 engages the outer edge of the flange 148, thus securing the stem 132 in position in the hub 138 and around the piston head 130 and rod 108.

A resilient pad 156 having a central bore 158 extending longitudinally therethrough is loosely disposed around the rod 108 and is disposed on the upper surface of the flange 114 as shown in FIG. 6. The outer diameter of the resilient pad 156 is preferably slightly less than the outer diameter of the flange 114 in the relaxed position of the pad 156 for a purpose as will be hereinafter set forth. In addition, the inner diameter of the pad 156 is larger than the outer diameter of the rod 108.

A hub member 160 is loosely disposed around the rod 108 and an outwardly extending circumferential flange 162 is welded or otherwise rigidly secured around the outer periphery thereof. The outer diameter of the flange 162 is preferably substantially equal to the outer diameter of the flanges 114 and 140 and rests on the upper end of the pad 156. A second resilient pad 164 generally similar or substantially identical to the pad 156 is disposed around the rod 108 and rests on the flange 162, and supports the flange 140 on the upper end thereof as shown in FIG. 6.

The rod 108 is in connection with the structural element 36 of the vehicle 10 through the plate 120 and pivotal connection 128. The stem 132 is in substantially constant engagement with the lower surface of the deck 138 through the upward force of the resilient pads 156 and 164 exerted thereagainst. When the wheels 16 move over rough terrain, or the like, and move upwardly with respect to the vehicle 10, the flange 114 is moved upwardly simultaneously therewith. The resiliency of the pads 156 and 164 absorb substantially all of the upward movement by compressing between the spaced flanges 114, 162 and 140. Of course, the upward movement of the flange 114 also moves the rod 108 upwardly and out of engagement with the shoulder 134 for reducing the downward force of the flange 148 aganot the pad 145.

When the wheels 16 move downwardly with respect to the vehicle 10, the flange 114 moves downwardly simultaneously therewith, carrying with it the rod 108 and flange 148. The pad 145 functions as a shock absorber, or rebound absorber by compressing between the flanges 148 and 140. Thus, the suspension assembly 50 not only facilitates the support of the wheel 16 from the vehicle, but also absorbs shock from the wheels in both the upward and downward vertical directions.

Figure 2:
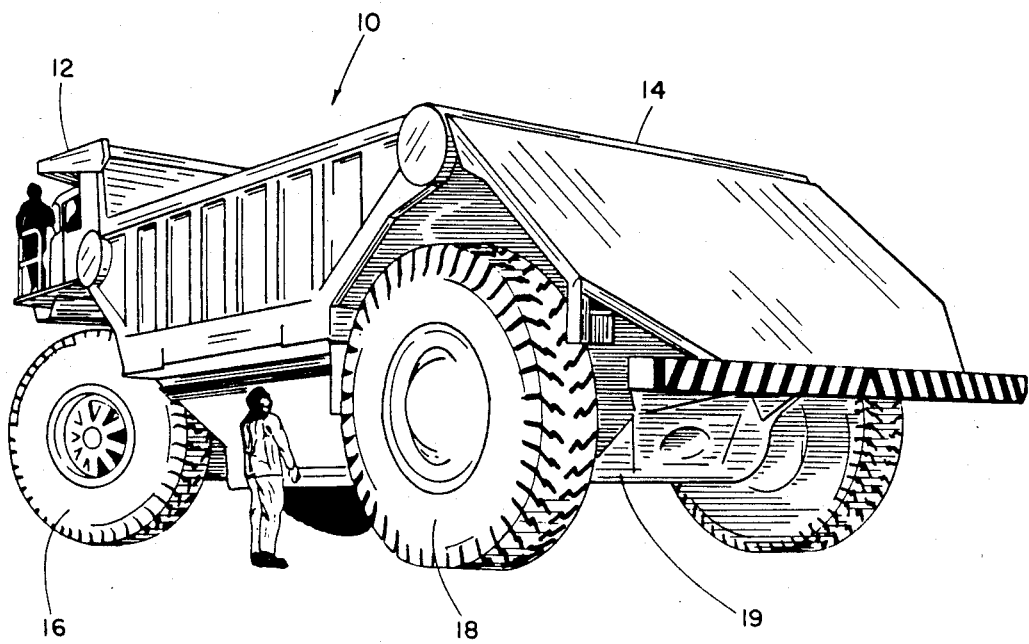
FIG. 2 is a left rear perspective view of an offhighway vehicle embodying the invention.

The dump body section 14 as shown herein is a bottom dump type, and is provided with doors 165 (only one of which is shown in FIG. 1) which open and close for alternately opening and closing the bottom opening (not shown) for discharge of the contents from the dump body. The doors 165 are preferably as shown in the co-pending Goodbary application entitled "Bottom Dump Door Linkage Apparatus and Dump Body Partition" Ser. No. 744,432, filed Nov. 23, 1976, now U.S. Pat. No. 4,106,813, issued Aug. 15, 1978. In addition, a transversely extending partition (not shown) such as that shown in the "Bottom Dump Door Linkage Apparatus and Dump Body Partition" application is provided in the dump body 14 for substantially equalizing the loading of the material being loaded into the vehicle 10.

Figure 3:
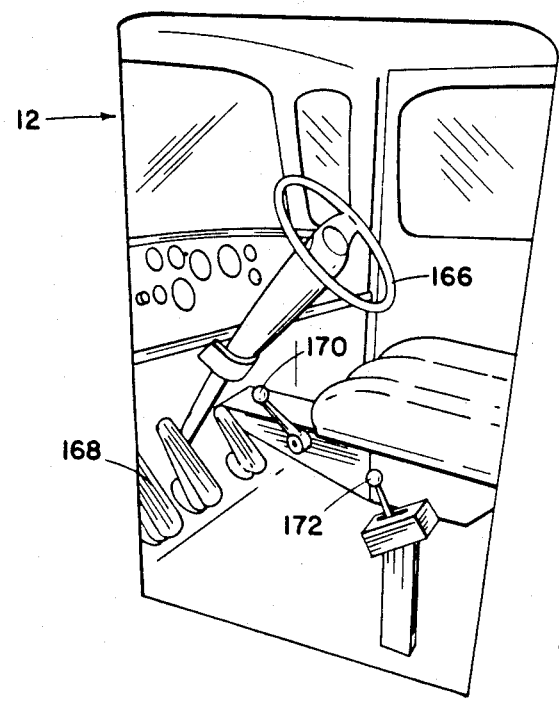
FIG. 3 is a perspective view of a portion of the interior of the cab section of an off-highway vehicle embodying the invention.

FIG. 3 depicts a portion of the interior of the cab section 12 which illustrates that the operation of the vehicle 10 is substantially identical with the operation of the more common or smaller vehicles, which facilitates the training of the operator of the vehicle. The usual steering wheel 166 is provided in the cab 12 and is utilized in the well known or common manner for steering of the vehicle 10. Suitable foot pedals 168 are provided in the cab section 12 with at least one of the pedals 168 being a brake pedal. The brake pedal 168 is arranged to actuate both the primary (not shown) and secondary (not shown) braking systems. When the brake pedal is depressed, both the braking systems are energized, but the dual braking system is so arranged that the secondary braking portion is like a "dead man" and does nothing while the primary braking portion provides the braking action. In the event of failure of the primary braking system for any reason, however, the secondary braking system immediately is activated and performs the braking operation.

It is also noted that band levers, such as shown at 170 and 172, for operation of the dump body doors 165, transmission, or the like, are conveniently located for ease of operation by the driver of the vehicle.

Referring again to FIGS. 1 and 2, the front A-frame 38 supports a front torque tube 174 which extends transversely across the vehicle 10 substantially at the juncture between the cab section 12 and the dump body section 14. All of the structural elements of the front portion of the vehicle 10 are cantilevered from the torque tube, including the deck 138. Thus, all of the front loads are efficiently distributed on the A-frame 38.

A rear A-frame structure, somewhat schematically illustrated at 176 in FIG. 1, supports a rear torque tube 178 which extends transversely across the vehicle 10 in the proximity of the rear thereof. All of the rear structural elements are carried by the rear torque tube 178, thus efficiently distributing the rear loads to the rear A-frame 176. This achieves substantially equal tire loading on all four tires of the vehicle with the resultant benefits therefrom as hereinbefore set forth. Front and rear wheel suspensions are connected to the A frames as shown in FIG. 4.

The cab section 12 is provided with a suitable engine generally indicated at 180 in FIG. 1. The engine 180 is preferably a diesel engine, but not limited thereto. The front mounting of the engine 180 substantially precludes contamination of the engine and resultant damage thereto from dust and the like created by the vehicle itself as it travels along rough terrain. Rear mounted engines in vehicles of this type are subject to much damage from the dust created by the vehicle itself, much less from other atmospheric conditions. In addition, a suitable electric motor, generally indicated at 182, is centrally mounted within each rear wheel 18, thus providing a rear wheel drive for the vehicle 10 in combination with the front mounted engine.

It is also to be noted that substantially all of the structural elements possible in the constuction of the vehicle 10 shown herein are pinned together rather than the more conventional welded type construction, or the like. This greatly facilitates the assembly and disassembly of the vehicle 10 for transportation purposes. These vehicles are oversized for being transported along a highway in the assembled condition thereof, or for that matter, for substantially any other type of transportation of the vehicle from site to site. The benefits of the pinned together type construction will be evident.

From the foregoing it is apparent that the present invention provides a novel off-highway vehicle particularly designed and constructed for overcoming the disadvantages of prior vehicles of this type. The novel vehicle provides a four point contact for the vehicle for greater stability during operation thereof, a bottom discharge dump body particularly designed for substantially equalizing the load being carried by the vehicle, the overall construction of the vehicle equalizes the load on the tires for reducing wear and prolonging the life thereof, the novel design provides a single wheel at each position thus reducing overall weight and heat generation for additional reduction of wear on the tires, a front mounted diesel engine is provided in combination with rear drive wheels, dual steering is provided for safety purposes as well as a dual braking system for safety. Overall, the vehicle is of a rugged, sturdy construction, designed for ease of operation and economy of maintenance.

Whereas the present invention has been described in particular relation to the drawings attached hereto, it should be understood that other and further modifications, apart from those shown or suggested herein may be made within the spirit and scope of this invention.

What is claimed is:

1. In an off-highway vehicle, a body support structure comprising upstanding non-pivoted front A-frame means, transversely extending front torque tube means disposed in spaced relation above and supported by said front A-frame means, rear A-frame means, and transversely extending rear torque tube means disposed in spaced relation above and supported by said rear A-frame means and supported therefrom, said front and rear torque tube means carrying all of the loads of the vehicle for efficient distribution of the load to the front and rear A-frame means.

2. In an off-highway vehicle, the body support structure set forth in claim 1 and including front wheel suspension means supported by said front A-frame means, and rear wheel suspension means supported by said rear A-frame means.

* * * * *